United States Patent [19]

Griffith et al.

[11] 4,256,983
[45] Mar. 17, 1981

[54] VOLTAGE-TO-FREQUENCY CONVERTER HAVING A CONSTANT FREQUENCY MODE OF OPERATION

[75] Inventors: Robert J. Griffith; Thomas D. Stitt, both of Erie, Pa.

[73] Assignee: General Electric Company, Erie, Pa.

[21] Appl. No.: 35,358

[22] Filed: May 2, 1979

[51] Int. Cl.³ .............................................. H03L 7/00
[52] U.S. Cl. .............................. 307/271; 340/347 M; 340/347 AD
[58] Field of Search .... 340/347 M, 347 NT, 347 CC, 340/347 AD; 235/92 FQ, 92 TF, 92 T; 324/78 R, 78 D, 78 E; 307/233 R, 271

[56] References Cited

U.S. PATENT DOCUMENTS

| 3,944,856 | 3/1976 | Horie ..................................... 307/240 |
| 4,009,475 | 2/1977 | DeFreitas ................. 340/347 NT X |
| 4,031,532 | 6/1977 | First .............................. 340/347 NT |

OTHER PUBLICATIONS

Burton, Replace Analog-To-Digital Converters With Voltage-To-Frequency..., Electronic Design 14, Jul. 5, 1978, pp. 84-86.
DeFreitas, The Low-Cost Way To Send Digital Data: Delta-Sigma Modulation..., Electronic Design 2, Jan. 18, 1974, pp. 68, 69.
The Engineering Staff of Analog Devices, Inc., Nonlinear Circuits Handbook, 1974, pp. 83-85.

*Primary Examiner*—Thomas J. Sloyan
*Attorney, Agent, or Firm*—Albert S. Richardson, Jr.

[57] ABSTRACT

A combination of integrating and logic means in an electrical circuit responds to inputs from a variable analog control signal and from a constant frequency train of digital pulses. The magnitude of the control signal is variable between predetermined low and high extremes. The logic means periodically generates discrete output signals in synchronism with the digital pulses. When the control signal is lower than a predetermined intermediate magnitude, the integrating means is saturated and the logic means is able to produce the output signals at a constant frequency. When the control signal is between its intermediate and high extreme magnitude, the integrator is active and governs the operation of the logic means in such a manner that the average frequency of the output signals varies between its constant magnitude and zero as an inverse linear function of the control signal magnitude.

6 Claims, 8 Drawing Figures

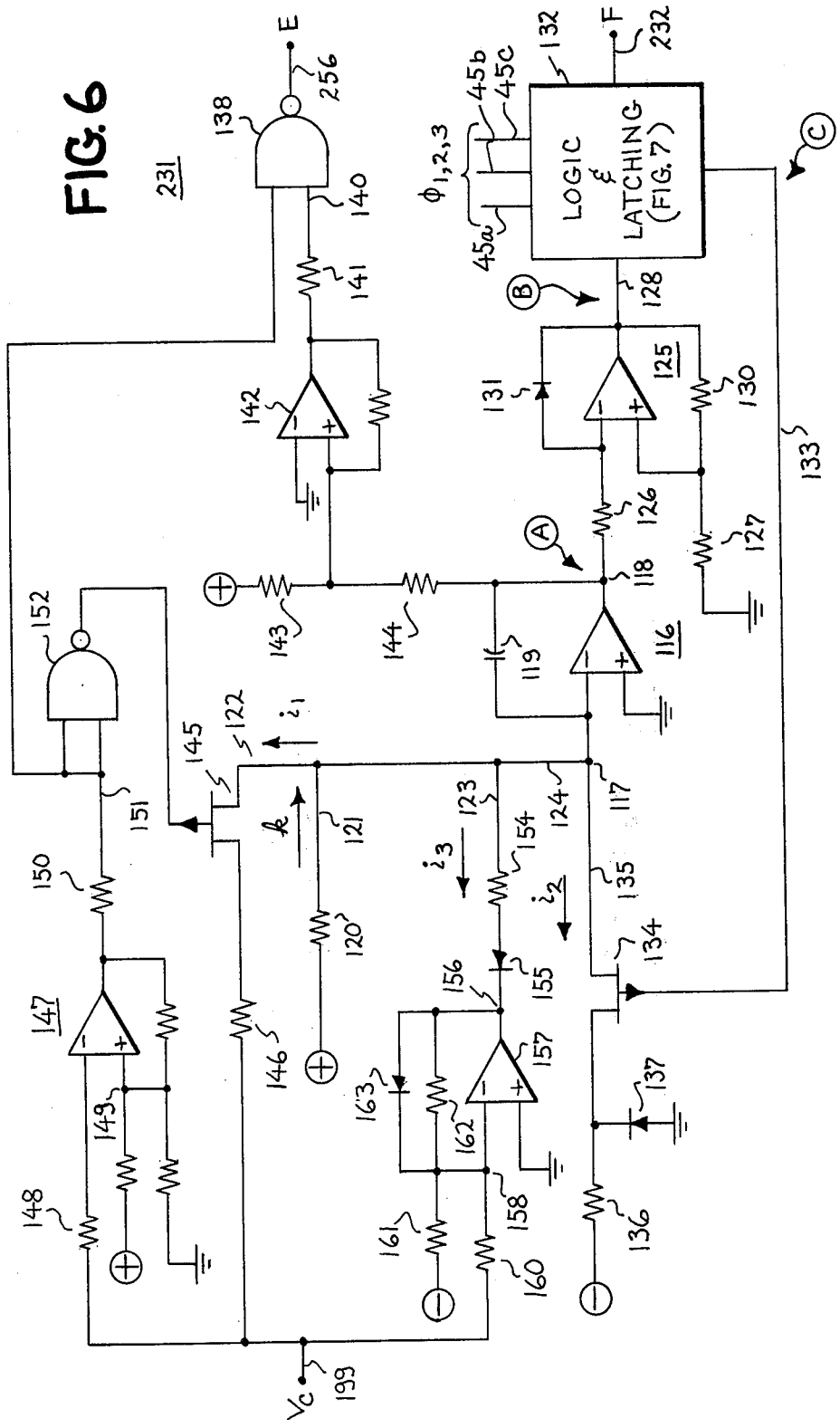

VOLTAGE-TO-FREQUENCY CONVERTER HAVING A CONSTANT FREQUENCY MODE OF OPERATION

BACKGROUND OF THE INVENTION

The present invention relates generally to voltage-to-frequency signal converters and more particularly to an improved voltage-to-frequency converter for generating periodic output signals that can be used for determining the frequency of operation of a time ratio control system that controls the magnitude of current supplied to an electric traction motor.

Large electrically driven traction vehicles such as locomotives or transit cars are propelled by a plurality of traction motors mechanically coupled to the respective wheel sets of the vehicle. Such motors are usually of the direct current (d-c) type. A d-c traction motor comprises a stator, a rotor, armature windings on the rotor, and field windings (either connected in series with the armature or separately excited) on the stator. In order to control its tractive effort, there is associated with the motor suitable means for regulating the magnitude of direct current in the motor armature. Electric power apparatus commonly known as a chopper is an energy conserving means for regulating armature current.

A chopper is essentially a controlled switch connected in circuit with the motor armature to meter current from a source of relatively constant d-c electric power to the motor. The switch is cyclically operated between open and closed states, and by appropriately controlling the timing of the successive transitions between these alternate states the magnitude of armature current can be varied or maintained substantially constant as desired. Assuming the chopper is in series with the motor and the propulsion system is operating in its motoring mode, during closed periods of the chopper the motor armature windings will be connected to the d-c power source through a path of negligible resistance, whereby virtually the full magnitude of the source voltage is applied to the motor armature and the current tends to increase. During the open periods of the chopper, the motor is disconnected from the power source and armature current, circulating through a free wheeling path, decays from the magnitude previously attained. In this manner, pulses of voltage are periodically applied to the motor, and an average magnitude of motor current (and hence torque) is established. The rate of change of current is limited by the circuit inductance.

The ratio of the closed time ($t_{ON}$) of the chopper to the sum of the closed and open times ($t_{ON}+t_{OFF}$) during each cycle of operation is the duty factor of the chopper. For a 0.5 duty factor, the repetitive closed and open periods of the chopper are equal to each other, and the width of each voltage pulse has the same duration as the space between successive pulses. In practice, so long as the chopper frequency is relatively high (such as, for example, 300 Hz) the circuit inductance (including the inductance provided by the armature windings of the traction motor itself) will smooth the undulating current in the motor armature sufficiently to prevent untoward torque pulsations, whereby the vehicle is propelled without any uncomfortable amount of jerking or lurching. By varying the duty factor of the chopper, the average chopper output voltage (as a percentage of the d-c source voltage) and consequently the average magnitude of current can be increased or decreased as desired. This is popularly known as time ratio control or pulse control.

A propulsion system using choppers can be adapted for electrical braking by reconnecting the power circuits so that each chopper is connected to the d-c power source in parallel rather than in series with its associated motor. In the braking mode of operation, a traction motor behaves as a generator, and the magnitude of its generated voltage (electromotive force) is proportional to speed and field excitation. The excitation of a series field machine is a function of the magnitude of armature current. With the chopper reconnected in parallel with the motor, during its closed periods the chopper provides a low resistance path for armature current which therefore tends to increase, whereas during its open periods the armature current path includes the power source and the free wheeling path, whereby current tends to decrease. The electric power output of the motor is either fed back to the source (regenerated), or dissipated in a dynamic braking resistor grid that can be connected in parallel with the chopper, or a combination of both. In either case, the average magnitude of armature current (and hence braking effort) can be controlled as desired by varying the duty factor of the chopper.

In an electrically driven traction vehicle that is powered from a wayside source of electricity, appropriate filtering means will be included in the propulsion system of the vehicle so as to provide a desired degree of electrical isolation between the chopper and the wayside power conductors. When a plurality of chopper/motor units are connected in a parallel array to a common filtering means, the amplitude of ripple current in the filter could be undesirably and unnecessarily high if all of the choppers were operated in unison. Therefore it is good practice in a multiple unit propulsion system to stagger or "phase shift" the closed periods of the respective choppers so that they are sequentially initiated at substantially equally spaced intervals during each cycle of operation. This not only will reduce the amount of ripple that needs to be isolated from the wayside power conductors but also will minimize the rms current in the filter capacitor, thereby minimizing the size of this component.

In the present state of the art, choppers for traction vehicle applications use high-power, solid-state controllable switching devices known as thyristors or silicon controlled rectifiers (SCRs). A thyristor is typically a three-electrode device having an anode, a cathode, and a control or gate terminal. When its anode and cathode are externally connected in series with an electric power load and a source of forward anode voltage (i.e., anode potential is positive with respect to cathode), a thyristor will ordinarily block appreciable load current until a firing signal is applied to the control terminal, whereupon it switches from its blocking or "off" state to a conducting or "on" state in which the ohmic value of the anode-to-cathode resistance is very low. Once triggered in this manner and latched in by conducting load current of at least a predetermined minimum magnitude prior to removal of the firing signal, the thyristor can be turned off only by reducing the current through the device to zero and then applying a reverse voltage across the anode and cathode for a time period sufficient to allow the thyristor to regain its forward blocking ability. Such a device forms the main load-currentcarrying switching element of the chopper, and suitable means is provided for periodically turning it on and off.

In practical applications the main thyristor of the chopper is periodically turned off by means of a "commutation" circuit connected in parallel therewith. A typical commutation circuit is a "ringing" circuit, i.e., the circuit contains inductive and capacitive components that develop an oscillating or ringing current. A chopper commutation circuit may include, for example, a precharged capacitor, an inductor, a diode, and the inverse parallel combination of another diode and an auxiliary thyristor. In a voltage turn-off type of chopper, these components of the commutation circuit are so interconnected and arranged as to divert load current from the main thyristor in response to turning on the auxiliary thyristor, and the main thyristor current is soon reduced to zero. The ringing action of the commutation circuit temporarily reverse biases the main thyristor which is consequently turned off, and during the reverse bias interval the current in the auxiliary thyristor oscillates to zero so that the latter component will also be turned off. For an ensuing brief interval, load current will continue to flow through the capacitor and a series diode in the commutation circuit of the chopper, thereby recharging the capacitor from the d-c source to complete the commutation process. Now the chopper is in an open or non-conducting state, and it cannot return to its closed or conducting state until the main thyristor is subsequently turned on by applying another firing signal.

The duty factor or percentage on time of the chopper is determined by the time delay between firing the auxiliary thyristor and subsequently firing the main thyristor during any full cycle of operation. The shorter this delay, the higher the duty factor, whereas the longer this delay, the lower the duty factor. Practical limits are imposed by the nature of the switching devices used in the chopper. For example, the maximum duty factor is approximately 0.91 for a chopper using a main thyristor rated 1,100 amps (average) and 2,000 volts (peak forward voltage) and operating at a constant frequency of approximately 300 Hz. A higher duty factor cannot be safely obtained at that chopping frequency because the aforementioned time delay must be at least 300 microseconds to make sure that the main thyristor is not re-fired prematurely, i.e., before the auxiliary thyristor has time to be completely turned off during the commutation process. For the same assumed parameters, the minimum duty factor would be approximately 0.09. This is because the minimum pulse width per cycle is determined by the recharging time of the capacitor in the oscillatory commutation circuit. Consequently, so long as it is being operated in a constant frequency variable pulse width mode, the chopper is effective to control motor current only in a limited range between its predetermined minimum and maximum duty factors.

It is generally desirable to be able to vary the chopper duty factor continuously over substantially the full range between 0 and 1.0. Smooth variations of the duty factor up to 1.0 are desirable during the motoring mode of operation to obtain maximum utilization of the available d-c source voltage when the vehicle is traveling at high speeds. Similar duty factor variations are also desirable during the braking mode of operation to obtain high, constant braking effort when the vehicle is traveling at low speeds. The higher the duty factor, the lower the minimum speed at which the maximum magnitude of armature current can be sustained during braking. Once the vehicle decelerates below this minimum speed, braking effort will decrease or fade out. In the improved propulsion system that is disclosed and claimed in co-pending U.S. patent application Ser. No. 35,352 filed concurrently herewith for R. B. Bailey and T. D. Stitt and assigned to the General Electric Company, an unusually low minimum brake fade out speed is obtained by operating electrical braking by operating the chopper in a constant high frequency, variable pulse width mode until the duty factor increases to its maximum at that frequency and then further increasing the duty factor by operating in a decreasing frequency, minimum "off time" mode.

For smooth motor starting it has heretofore been proposed to reduce the chopper frequency and operate in a variable frequency minimum pulse width mode so as to extend the range of duty factor variations below the minimum that can be obtained when the chopper is operated in a constant high frequency, variable pulse width mode. In a known method of this kind, a starting interval of predetermined duration is initiated by a motor starting signal, and during this interval the firing frequency of the auxiliary thyristor gradually increases from zero to the predetermined running frequency of the chopper. Firing of the main thyristor is temporarily inhibited during the starting interval, whereby current is supplied to the motor armature through the auxiliary thyristor. Due to the oscillatory nature of the commutation circuit in the chopper, each time the auxiliary thyristor is fired it conducts a narrow pulse of load current and is then automatically turned off. Therefore the average magnitude of the chopper output voltage will vary directly with chopping frequency during the starting interval.

SUMMARY OF THE INVENTION

Accordingly, it is a general objective of the present invention to provide improved frequency controlling means useful in the chopper controls of a d-c traction motor propulsion system wherein the chopping frequency is constant over a normal range of motor speeds and the pulse width is variable so that the duty factor can be varied as desired between predetermined minimum and maximum limits and wherein the frequency is varied from the constant amount to zero to permit smoothly increasing the duty factor above the predetermined maximum limit.

Another objective of this invention is the provision, for controlling a dual mode chopper that has both constant frequency and variable frequency modes of operation, of improved means well suited in either mode for evenly staggering the repetitive off periods of the chopper with respect to the off periods of at least one similar chopper in a multiple chopper/motor propulsion system.

Yet another objective is to provide an electric circuit responsive to both an analog control signal of variable magnitude and a train of clock pulses of constant frequency for generating periodic signals in synchronism with the clock pulses, the periodic signals having the same frequency as the clock pulses when the magnitude of the control signal is in a predetermined range and having an average frequency inversely proportional to the control signal when its magnitude is above that range.

A more specific objective of this invention is to provide a voltage-to-frequency converter well suited for practical application in the cyclically operative means that is disclosed in the above-cited co-pending patent application Ser. No. 35,352, which means produces periodic gating signals for alternately turning on and turning off a chopper.

In carrying out our invention in one form, an integrator is supplied with first and second input signals, and its output is connected to a threshold detector which is either in a first state when the integrator output is on one side of a predetermined threshold or in a second state when the output is on the other side of that threshold. The first input signal is applied continuously to the integrator, and its value is determined by the magnitude of a control signal that is variable between low and high extremes. In a range of control signal variations defined by the high extreme and a predetermined intermediate magnitude, the value of the first input signal is varied as an inverse linear function of the magnitude of the control signal, and it is zero at the high extreme of the control signal. The second input signal is applied to the integrator for a limited interval when a normally open switch is closed, and its value is constant. The limited interval of the second signal is equal to two-thirds of a period of a train of constant clock pulses that is supplied by a master clock, and the constant value is 150 percent of the value that the first signal will have whenever the control signal is equal to the aforesaid intermediate magnitude.

The second input signal is applied to the integrator subtractively with respect to the first input signal, and the integrator output tends to change from the aforesaid one side to the other side of the predetermined threshold when the value of the first signal exceeds that of the second signal. Logic means is responsive to the threshold detector changing from its first to its second states for closing the aforesaid switch and for producing a discrete output signal in synchronism with one of the clock pulses supplied to the detector by the master clock, and the logic means is also operative periodically to produce additional output signals synchronized with successive clock pulses so long as the detector remains in its second state. Consequently, the frequency of the output signals corresponds to the constant frequency of the clock pulses when the magnitude of the control signal is lower than said predetermined intermediate magnitude, but it decreases toward zero as the control signal magnitude increases within its predetermined range and approaches its high extreme.

The invention will be better understood and its various objects and advantages will be more fully appreciated from the following description taken in conjunction with the accompanying drawings.

BRIEF DESCRIPTION OF THE DRAWINGS

FIG. 6 is a schematic circuit diagram of the V/F converter block embodying the present invention;

DESCRIPTION OF THE PREFERRED EMBODIMENT

Figure 1:
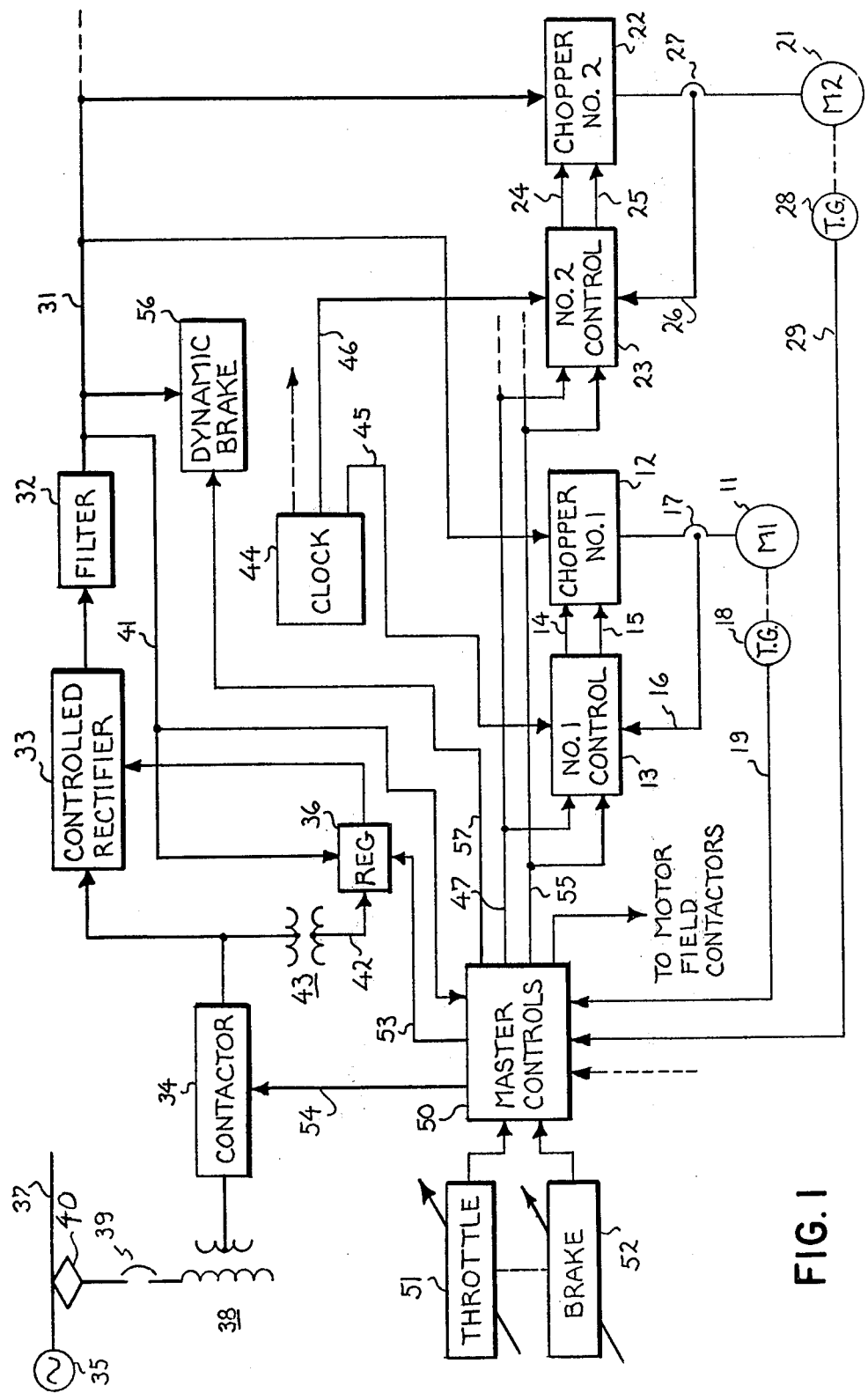
FIG. 1 is a function block diagram of a traction vehicle propulsion system having a plurality of chopper/motor units connected in parallel to a d-c bus.

FIG. 1 depicts a propulsion system comprising at least two d-c traction motors 11 and 21 suitable for propelling or retarding a large traction vehicle such as a locomotive or transit car. The motors 11 and 21 are shown symbolically in FIG. 1 and are respectively labeled "M1" and "M2". It will be understood that each motor has conventional armature and series field windings (see FIG. 2). The motor rotors are mechanically coupled by speed reducing gears to separate wheel sets of the vehicle (not shown), and the armature windings of the motors M1 and M2 are electrically connected via duplicate electric power choppers 12 and 22, respectively, to a common d-c power bus 31. Persons skilled in the art will be aware that additional chopper/motor units can be readily connected to the bus 31 in parallel with the two units that are illustrated in FIG. 1. The d-c bus 31 is coupled to a suitable source of d-c electric power. Conventional filtering means 32, including a shunt capacitor, is connected between bus and source for isolation purposes and to provide a bypass of the source for higi-frequency, chopper generated currents.

Preferably the d-c power source for the propulsion system includes a controllable electric power converter 33, means including a contactor 34 for connecting the input of the converter 33 to a source 35 of relatively constant voltage, and regulating means 36 effective when the propulsion system is operating in a motoring mode for controlling the converter 33 so as to limit the average magnitude of voltage across the shunt capacitor in the filter 32 to a predetermined level (e.g., 1750 volts) during light load conditions when the capacitor voltage would othewise tend to rise higher. In the illustrated embodiment of the invention, the voltage source 35 is stationary and feeds alternating voltage of relatively high magnitude and commercial power frequency to an alternating current (a-c) line 37 comprising a catenary or third rail located along the wayside of the traction vehicle. The magnitude of the a-c line voltage may be, for example, 25,000 volts rms, and the frequency may be 60, 50 or 25 Hz. Onboard the vehicle there is a power transformer 38 to step down this voltage. The primary winding of the power transformer 38 is connected by way of a high voltage circuit breaker 39 to a current collector 40 (e.g., a pantograph) that makes sliding contact with the wayside line 37. The secondary winding of the transformer 38 is connected by way of separable contacts of the contactor 34 to a set of a-c input terminals of the converter 33.

Preferably the converter 33 is a phase-controlled rectifier circuit utilizing controllable solid state electric valves such as thyristors or silicon controlled rectifiers in selected legs of a full-wave bridge rectifier configuration, and the associated regulating means 36 is constructed and arranged in accordance with the teachings of U.S. Pat. No. 4,152,758 issued May 1, 1979, on a patent application Ser. No. 836,457 filed for R. B. Bailey, T. D. Stitt, and D. F. Williamson, on Sept. 26, 1977, and assigned to the General Electric Company, which patent is expressly incorporated herein by reference. As is indicated in FIG. 1, a capacitor voltage feedback signal is supplied from the d-c bus 31 to the regulating means 36 on a line 41, and an alternating voltage feedback signal is supplied to the regulating means 36 on a line 42 which is coupled through a potential transformer 43 to the input terminals of the controlled rectifier circuit 33.

In order to meter the current in the armatures of the motors M1 and M2 that are connected in parallel array to the d-c bus 31, each of the respective choppers 12 and 22 is alternately turned on (closed) and turned off (opened). For the first chopper 12 this pulsing type of operation is controlled by an associated No. 1 control means 13 which normally supplies chopper No. 1 with alternate turn on and turn off signals on lines 14 and 15, respectively, and the second chopper 22 is controlled by a similar No. 2 control means 23 which normally supplies it with alternate turn on and turn off signals on lines 24 and 25, respectively. The chopper turn on and turn off signals are synchronized with a train of discrete clock pulses that are generated at a constant high frequency (e.g., 300 Hz) by a master clock 44. The clock 44 is connected to the control means 13 and 23 by lines 45 and 46, respectively. The clock pulses supplied on line 46 to the No. 2 control means 23 are phase shifted or staggered with respect to the clock pulses that are supplied on line 45 to the No. 1 control means 13, whereby the two or more choppers used in the illustrated propulsion system have their respective turned-off periods sequentially initiated at substantially equally spaced intervals during each cycle of operation. By operating the choppers in sequence rather than in unison, the amplitude of ripple current in the filtering means 32 and the rms current in the filter capacitor are desirably reduced, thereby minimizing the size of the filtering components that are required to provide a desired degree of electrical isolation between the choppers and the wayside power line 37.

Figure 4:
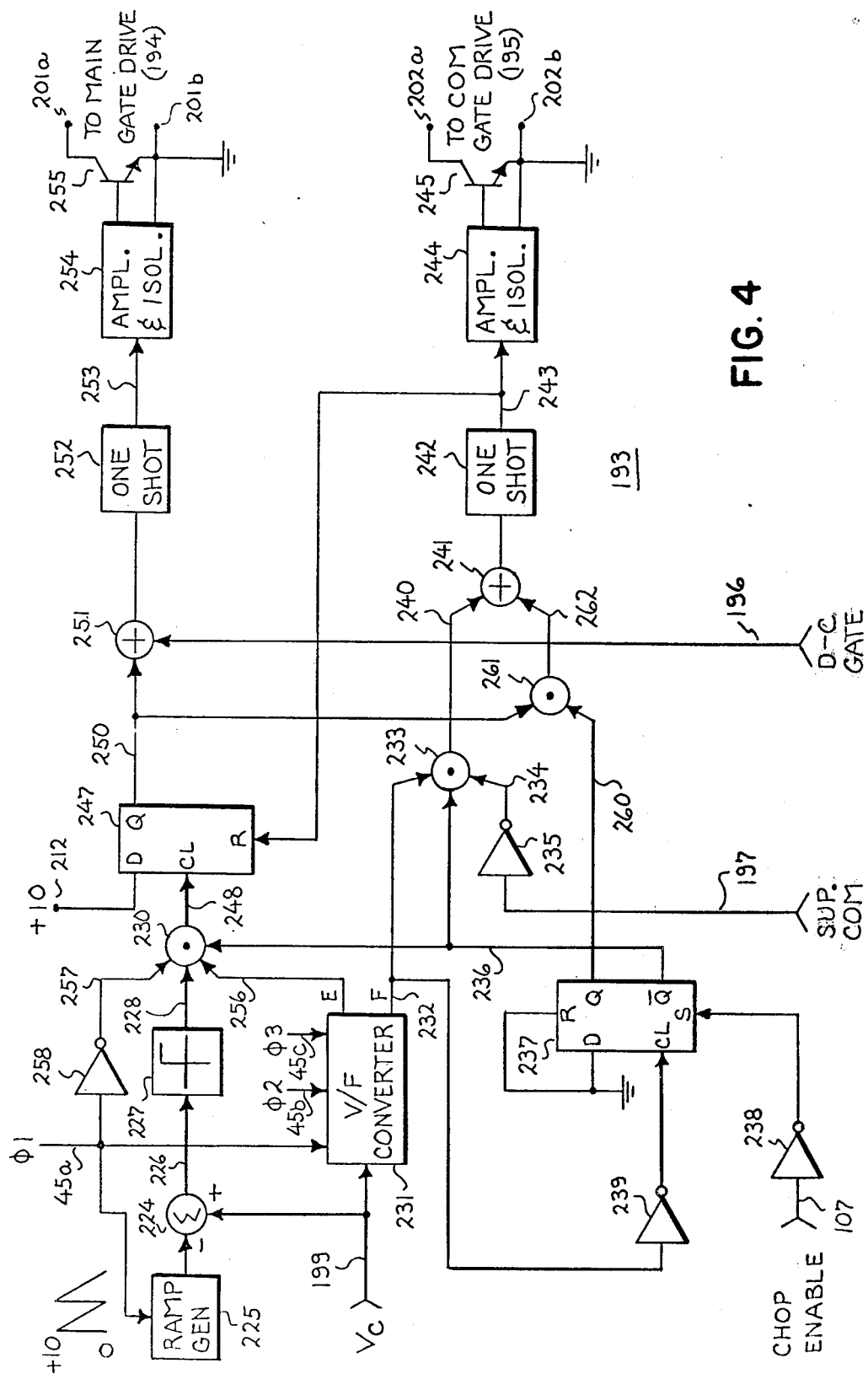
FIG. 4 is a schematic diagram of the chopper pulses block of FIG. 3.

In each of the motors M1 and M2 the average magnitude of armature current (and hence motor torque) will depend on the duty factor of the associated chopper. As will soon be explained in more detail, each of the control means 13 and 23 is arranged to vary the duty factor as necessary to minimize any difference between a current feedback signal and a current reference signal. To provide current feedback signals, conventional current transducers 17 and 27 in the armature current paths of the respective motors M1 and M2 are connected via lines 16 and 26 to the control means 13 and 23, respectively. The current reference signal in each control means is derived from a current call signal received on line 47 from a master controls block 50. The chopper control means 13 (and 23) has the capability of smoothly varying the duty factor of the chopper 12 (and 22) over a continuum that extends all the way between zero at one extreme (chopper turned off continuously) and 1.0 at the opposite extreme (chopper turned on continuously). This will be more apparent hereinafter when FIGS. 4 and 6 are described.

The master controls 50, shown as only a single block in FIG. 1, perform several functions that will now be briefly summarized. The construction and operation of these controls are explained in more detail in the above-cited patent application Ser. No. 35,352 which is expressly incorporated herein by reference. One function of the master controls is to provide the aforesaid current call signal on output line 47. The value of this signal is varied as a function of the setting of either a manually operated throttle 51 or a manually operated brake controller 52, which is mechanically interlocked with the throttle, and it is also a function of the speed of the vehicle. The vehicle speed is indicated by speed sensing means 18 and 28 which are respectively coupled to the wheel sets of the vehicle or to the armatures of the motors M1 and M2. These speed sensing means typically are tachometer generators, and they feed back to the master controls 50 on lines 19 and 29 signals representative of the angular velocities of the armatures of the respective motors.

Another function of the master controls 50 is to provide a voltage reference signal for the regulating means 36 that controls the phase-controlled rectifier circuit 33 in the d-c electric power source of the illustrated propulsion system. This signal is supplied over a line 53 from the master controls to the regulator 36. Its value, which is set in the master controls, determines the limit level of voltage across the shunt capacitor in the filter 32.

A third function of the master controls 50 is to carry out an orderly transition of the propulsion system between its motoring and braking modes on command. This entails actuating the contactor 34 that connects the input terminals of the controlled rectifier circuit 33 to the secondary windings of the power transformer 38, and accordingly the master controls are shown connected to the contactor 34 by a line 54. It also entails actuating certain additional contactors and a reverser in the armature and field circuits of the motors 11 and 21. These additional contactors and the reverser for the first motor 11 are shown in FIG. 2 which will soon be described.

At the start of a braking mode of operation the master controls 50 will momentarily boost the motor fields and will suply a burst firing signal on line 55 to the chopper control means 13 and 23. The burst firing signal causes each of the control means 13 and 23 to supply an extended turn on signal to its associated chopper, thereby ensuring that the chopper in fact turns on while the field is being boosted.

When the illustrated propulsion system is operating in its braking mode, electric energy from the motors M1 and M2 (now behaving as generators) is dissipated in a resistor grid that needs to be connected to the d-c power bus 31 for this purpose. The braking resistor grid is represented in FIG. 1 by a block 56 labeled "Dynamic Brake," and the master controls 50 are connected to this block by a line 57 in order to actuate a contactor that will connect certain resistors in the grid in parallel circuit relationship with the shunt capacitor in the filter 32 in response to a transition from motoring to braking modes of operation. It should be noted that a single dynamic brake 56 is shared by all of the choper/motor units that are connected in parallel to the d-c bus 31. There is also provided in the master controls means effective during braking for actuating additional "staging" contactors in the dynamic brake block 56 for changing, in three discrete steps, the amount of resistance connected to the d-c bus as necessary to prevent the generated energy from charging the filter capacitor to an unacceptably high level of voltage.

Figure 2:
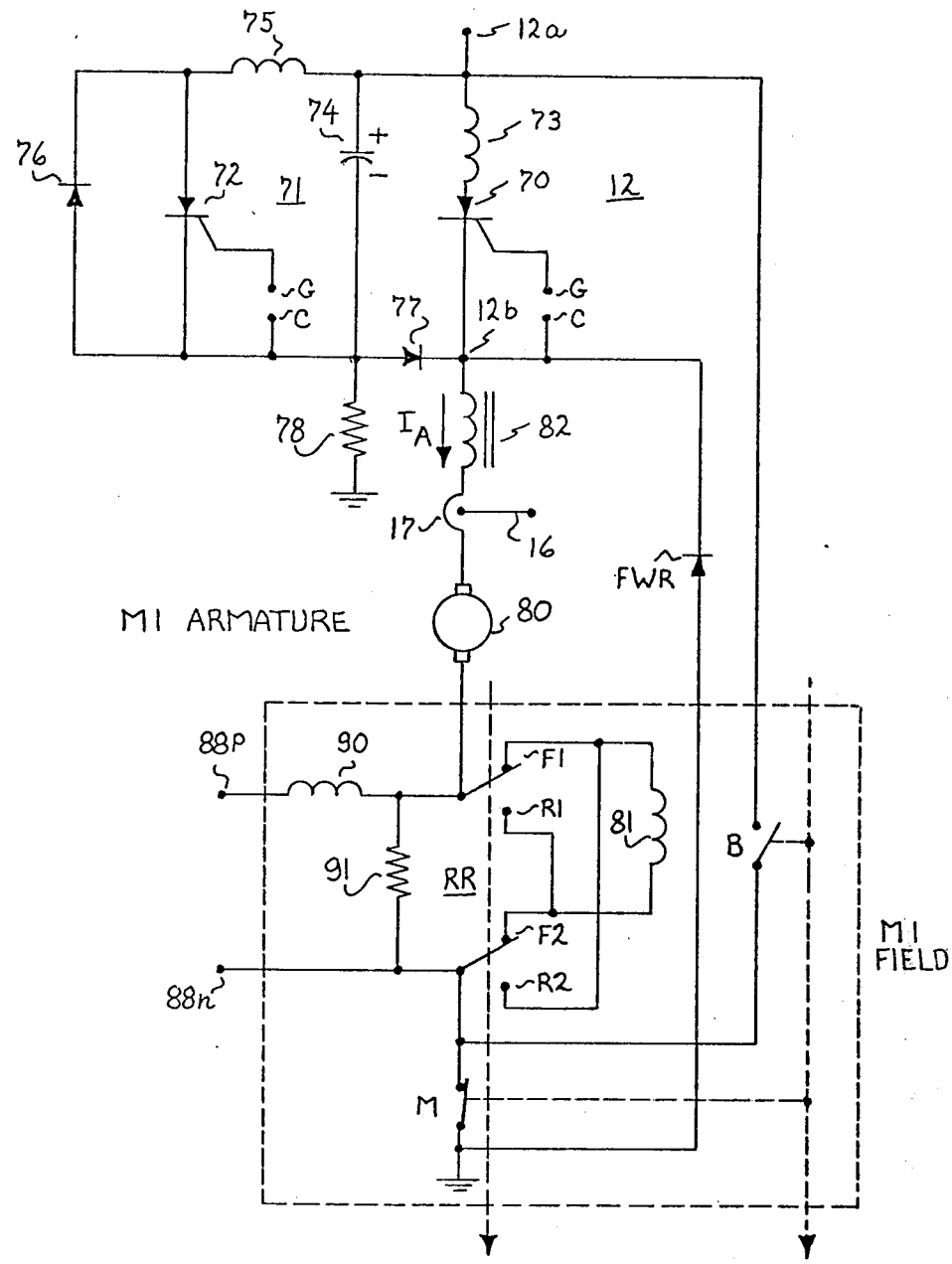
FIG. 2 is a schematic circuit diagram of one of the chopper/motor units shown symbolically in FIG. 1.

Turning next to FIG. 2, a preferred embodiment of the first chopper 12 will now be described. The illustrated chopper is of the type disclosed in U.S. Pat. No. 4,017,777 issued on Apr. 12, 1977, to R. B. Bailey and assigned to the General Electric Company. In brief, it comprises a main thyristor 70, an oscillatory commutation circuit 71 connected across the main thyristor, and an auxiliary or commutating thyristor 72 in the commutation circuit. The main thyristor 70 is connected between the power terminals 12a and 12b of the chopper, with a commutating inductor 73 being disposed between its anode and the terminal 12a. The anode terminal 12a of the chopper 12 is connected directly to a positive conductor of the d-c power bus 31.

The commutation circuit 71 of the chopper includes, in addition to the thyristor 72, a commutating capacitor 74, an inductor 75, and a diode 76. The positive plate of the capacitor 74 is connected directly to the terminal 12a, and the negative plate of this capacitor is connected to the terminal 12b through a diode 77 that is poled to block capacitor discharge current when the main thyristor 70 is turned on. The auxiliary thyristor 72 is connected across the commutating capacitor 74, with the inductor 75 being connected between its anode and the positive plate of the capacitor. The commutating thyristor 72 is shunted by the inversely poled diode 76, and its cathode is connected through a resistor 78 to ground. The gate or control electrode and the cathode of each of the thyristors 70 and 72 are connected to gate and cathode terminals G and C, respectively. While each of the thyristors 70 and 72 and each of the diodes 76 and 77 has been shown in FIG. 2 as a single element, it will be understood that in practice, if required in choppers having high voltage and/or current ratings, additional elements of like kind could be connected in series and/or parallel with the illustrated elements and operated in unison therewith.

Normally the chopper 12 is turned on by firing the main thyristor 70. This is done by applying a discrete signal of appropriate magnitude and duration across its gate and cathode terminals. With the main thyristor 70 turned on and the commutating capacitor 74 charged, the diode 77 is reverse biased and there is no current in the commutation circuit 71. Subsequently the commutating thyristor 72 is fired by applying across its gate and cathode terminals a discrete chopper turn off signal of appropriate magnitude and duration. Now the commutating capacitor 74 will discharge through the inductor 75. The resulting ringing action of the commutation circuit 71 soon forward biases the diode 77, whereupon current in the main thyristor 70 is reduced to zero and the main thyristor is temporarily reverse biased. This turns off the main thyristor 70. During the reverse bias interval the current in the commutation circuit 71 oscillates to zero and reverses direction. While current is flowing through the diode 76, the commutating thyristor 72 is reverse biased and consequently turned off. For an ensuing brief interval, current continues to flow through the commutating capacitor 74 and the diode 77, thereby recharging the capacitor from the d-c source to complete the commutation process. Now the chopper is turned off, and it will remain in this state until the main thyristor 70 is refired by the next turn on signal.

So long as the propulsion system is operating in its motoring mode, the chopper 12 is periodically turned on and off to regulated the average magnitude of current flowing from the d-c power source to the armature and series field windings of the associated motor M1. In FIG. 2 the armature of this motor is shown at 80, and the series field winding is shown at 81. The chopper 12, the armature 80, and the field 81 are connected in series with one another between the terminal 12a and ground, and this series combination of components is therefore connected across the filter capacitor. As is shown in FIG. 2 the means for serially interconnecting these components includes a current smoothing reactor 82 and the current transducer 17, both of which are connected between the cathode terminal 12b of the chopper and the armature 80, and a contactor M which connects the series field 81 to ground. The contactor M is closed (as shown) during the motoring mode of operation and is open during the braking mode of operation. The interconnecting means also includes a reverser RR that determines the polarity of the connection of the series field winding 81 relative to the armature 80.

The reverser RR is illustrated as a double-pole double-throw contactor. When this reverser is in a first position, the movable contact comprising one of its poles engages a stationary contact F1 and the movable contact comprising its other pole engages a stationary contact F2, whereas when the reverser is in a second, alternative position, the first-mentioned movable contact engages a stationary contact R1 which is connected to contact F2, and the other movable contact engages a stationary contact R2 which is connected to contact F1. Either the armature 80 or the series field winding 81 can be connected between the contacts F1 and F2. As illustrated in FIG. 2, it is the field winding 81 that is so connected.

During intervals when the chopper 12 is turned off, armature current $I_A$ in the motor M1 is conducted by free wheeling rectifier means FWR which is connected in circuit with the armature 80 and field 81. In FIG. 2 the free wheeling rectifier means is shown as a simple diode having its anode connected to ground and its cathode connected to the cathode terminal 12b of the chopper 12. Whenever this element is conducting current, terminal 12b is at nearly ground potential. If desired, the free wheeling rectifier means FWR can comprise a thyristor instead of the illustrated diode. If a thyristor were used, its firing can be controlled by the improved gate means described and claimed in copending patent application Ser. No. 973,973 filed for R. B. Bailey on Dec. 28, 1978, and assigned to the General Electric Company.

To change from motoring to braking modes of operation, the contactor M is opened and a companion contactor B is closed. As is shown in FIG. 2, the contactor B, when closed, connects the last-mentioned movable contact of the reverser RR to the anode terminal 12a of the chopper 12 (and hence to the positive conductor of the d-c bus 31). Consequently, when the contactor M is actuated to its open position and the contactor B is actuated to its closed position, the propulsion system is reconnected to establish an armature current path comprising the field winding 81 and the contactor B in series with at least two parallel branches. A first one of these parallel branches is provided by the chopper 12, and the second parallel branch is provided by the filter capacitor (not shown) in series with the free wheeling rectifier means FWR. The conducting direction of the free wheeling rectifier means in the second parallel branch enables armature current to charge the filter capacitor when the chopper 12 is turned off but blocks discharge of this capacitor through the chopper when turned on. A third branch paralleling the first and second branches of the armature current path is provided by resistor grid in the block 56 (FIG. 1) whenever a dynamic brake contactor is closed.

During the transition from motoring to braking modes of operation, the reverser RR is actuated so as to reverse the polarity of the connection of the series field winding 81 relative to the armature 80 of the motor M1. With the field 81 connected to the reverser RR as shown in FIG. 2, actuation of the reverser will reverse the direction of current in the field 81 and thereby reverse the polarity of the electromotive force generated in the armature windings 80 during the braking mode of the operation (when the motor M1 is behaving as a generator). As a result, the electromotive force will be applied across the chopper 12 with the proper polarity to forward bias the main thyristor 70.

A resistor 91 is connected in parallel with the field 81 to minimize the effect of chopper-induced ripple on motor commutation. In order to momentarily increase the field excitation of motor M1 at the beginning of the braking mode of operation, the field is connected through a current limiting inductor 90 to a pair of terminals 88p and 88n that are adapted to be connected to suitable field boost means (not shown). A preferred embodiment of the field boost means, which is temporarily operative in response to a motoring-to-braking transition of the propulsion system, is disclosed in the above-cited patent application Ser. No. 35,352. The reverser RR, as well as the respective contactors M and B in the armature circuit of the motor M1, are coupled by broken lines to suitable mechanisms in the master control 50 (FIG. 1) for actuating these components and thereby detemining their respective opened and closed positions. The same mechanisms can also be coupled, respectively, to a similar reverser and to similar contactors that are connected in the field and armature circuits of the second chopper/motor unit 22/M2, whereby the second unit of the propulsion system is reconnected for braking operation and the polarity of its field is reversed with respect to its armature connection simultaneously with the occurrence of these events in the FIG. 2 chopper/motor unit.

Figure 3:
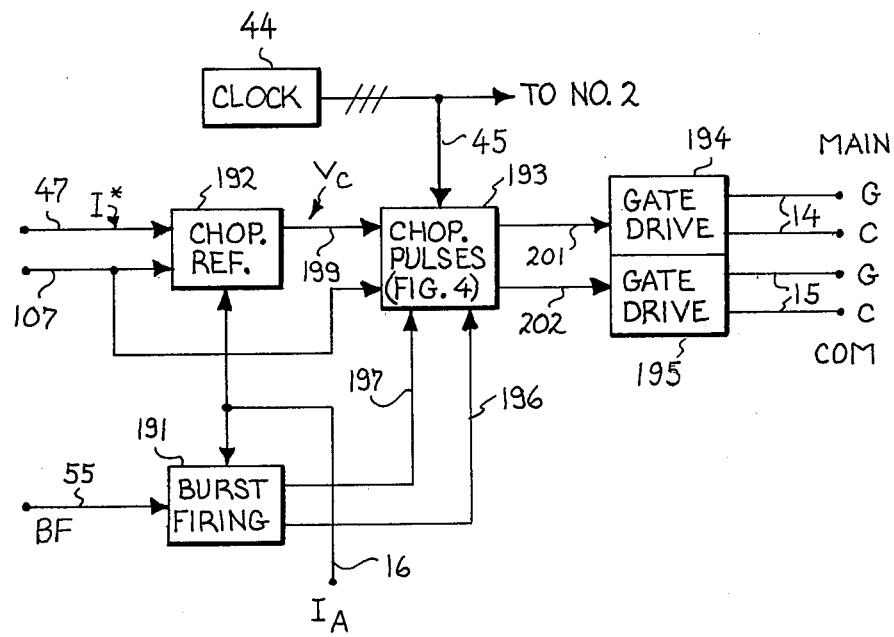
FIG. 3 is a functional block diagram of the NO. 1 chopper control shown as a single block in FIG. 1.

The No. 1 control means 13 that periodically turns on and off the first chopper 12 has been illustrated in FIG. 3 in functional block diagram form. It comprises a block 191 labeled "Burst Firing," a block 192 labeled "Chop. Ref," a block 193 labeled "Chop. Pulses," and a pair of blocks 194 and 195 each labeled "Gate Drive." The line 55 conveys a burst firing signal BF from the master controls 50 to an input of the burst firing block 191. Another input of this block receives on the line 16 the current feedback signal representative of armature current $I_A$ in motor M1. The burst firing block 191 has two output lines 196 and 197 connected to the chop pulses block 193, and it is suitable constructed and arranged (see application Ser. No. 35,352) to supply on the line 196 a d-c gate signal that is contemporaneous with the burst firing signal on line 55 and to supply on line 197 a commutation suppressing signal that is initiated by the burst firing signal and terminated when the magnitude of $I_A$ increases to at least a predetermined threshold (e.g., 100 amperes).

Inputs to the chopper reference block 192 in the No. 1 control means 13 are provided, respectively, by a chop enable signal on a line 107 from the master controls 50, a current call signal I* on line 47 from the reference generator in the master controls, and the current feedback signal on line 16 from the current transducer 17 in the armature current path of the motor M1. The chopper reference block 192 is suitable constructed and arranged to process these inputs and produce therefrom a variable control signal $V_C$ representative of the desired duty factor of the associated chopper 12. This analog control signal is supplied on a line 199 to the chopper pulses block 193.

As is explained more fully in the above-cited application Ser. No. 35,352, the magnitude of the analog control signal $V_C$ varies as a function of any difference or error between desired and actual magnitudes of armature current $I_A$ in the motor M1, and it will tend to assume whatever value results in reducing this difference to zero. The desired magnitude of $I_A$ is represented in the chopper reference means 192 by a current reference signal. Normally, so long as there is a chop enable signal on the line 107, the value of this current reference signal is determined by the current call signal on line 47. But during a motoring-to-braking transition the chop enable signal is temporarily removed, and the current reference signal is then reduced to a reset value that is slightly negative with respect to ground potential. The magnitude of $V_C$ can vary between predetermined first and second extremes, and it is varied in a sense approaching the second or high extreme (e.g., +10 volts) from its first or low extreme (e.g., −1.5 volts) so long as the actual magnitude of $I_A$ is less than the desired magnitude. The timing of the alternate first and second gating signals that are periodically produced by the cyclically operative chopper pulses block 193, and consequently the duty factor of the chopper 12, are determined by the magnitude of $V_C$ on line 199. When the value of $V_C$ is at its low extreme, the duty factor is zero (chopper turned off continuously), and when $V_C$ is at its high extreme the duty factor is 1.0 (chopper turned on continuously).

The chopper pulses block 193 has five inputs that are respectively connected to lines 45, 199, 107, 197, and 196, and it has two output lines 201 and 202. Details of a preferred embodiment of this component are shown in FIG. 4 which will soon be described. Normally the chopper pulses block 193 is cyclically operative to produce on its output line 201 a train of first periodic gating signals of relatively short predetermined duration (e.g., 10 microseconds) and to produce on its second output line 202 a train of periodic second gating signals of the same short duration. The first gating signals are supplied on line 201 to the input of the gate driver 194 whose output is coupled via the lines 14 to the gate and cathode terminals G and C of the main thyristor 70 in the No. 1 chopper 12, and the component 194 is suitably constructed and arranged to supply a firing signal to this main thyristor in response to each of the first gating signals received on line 201. The periodic second gating signals from the chopper pulses block 193 are supplied on the line 202 to the input of the companion gate driver 195 whose output is coupled via lines 15 to the gate and cathode terminals G and C of the auxiliary or commutating thyristor 72 in the No. 1 chopper, and the component 195 is suitably constructed and arranged to supply a firing signal to this commutating thrysitor in response to each of the second gating signals received on line 202. As will be apparent hereinafter from the description of FIG. 4 the first gating signals on line 201 are produced alternately with the second gating signals on line 202, whereby the gate drivers are effective to alternately turn on and turn off the chopper. The chopper pulses block 193 includes means for synchronizing the second gating signals with the clock pulses on line 45 and means responsive to the value of the variable control signal $V_C$ on line 199 for influencing the timing of the first and second gating signals so as to determine the duty factor of chopper No. 1.

At the beginning of a braking mode of operation, the d-c gate signal on line 196 is passed through the pulses block 193 to the output line 201 in the form of an extended chopper turn-on signal that effects firing of the main thyristor 70 throughout the period of the burst firing signal on line 55, which period is substantially longer than the duration of a first gating signal that the block 193 periodically produces in normal operation. At the same time the commutation suppressing signal received on line 197 is effective in the block 193 to prevent the production of any second gating signal on the line 202 until the magnitude of armature current increases to at least the aforesaid predetermined threshold.

FIG. 4 illustrates the preferred embodiment of the chopper pulses block 193. In this component the variable control signal $V_C$ on line 199 is supplied as one input to a summing point 224 where it is compared with a saw-tooth reference signal produced by a ramp generator 225. The ramp generator 225 is connected to the master clock 44 by a line 45a, and it is periodically reset by a phase 1 clock pulse on this line. The clock 44 generates a train of phase 1 pulses on the line 45a, each pulse being in a 1 state for a predetermined duration (e.g., 300 microseconds) and successive pulses recurring at a constant frequency (e.g., 300 Hz).

The ramp generator 225 comprises integrating means for changing the value of the reference signal at a predetermined constant rate and means operative in synchronism with the phase 1 clock pulses for periodically resetting the reference signal to a predetermined base value which is substantially equal to the aforesaid high extreme of the control signal $V_C$ (e.g., +10 volts). After being reset, the reference signal changes in a sense approaching the aforesaid low extreme value of $V_C$, and the rate of change is selected so that the reference signal excursion is approximately 10 volts during one period of the clock pulses. This reference signal is subtracted from $V_C$ in the summing point 224, and the difference is supplied on a line 226 to a zero crossing detector 227 whose output is fed on a line 228 to an AND logic circuit 230. In digital terms, the signal on the output line 228 is low or "0" so long as the value of the reference signal produced by the ramp generator is greater (i.e., more positive) than the value of the control signal $V_C$, and it is high or "1" whenever the latter signal is greater than the former. When $V_C$ is at its high extreme, the signal on line 228 is 1 continuously. When $V_C$ has a negative value the signal on line 228 is 0 continuously. When $V_C$ is in a range between zero and its high extreme, the signal on line 228 will change states twice each cycle of the master clock; from 1 to 0 when reset by a phase 1 clock pulse, and from 0 to 1 concurrently with the value of the reference signal equalling the value of $V_C$.

Figure 5:
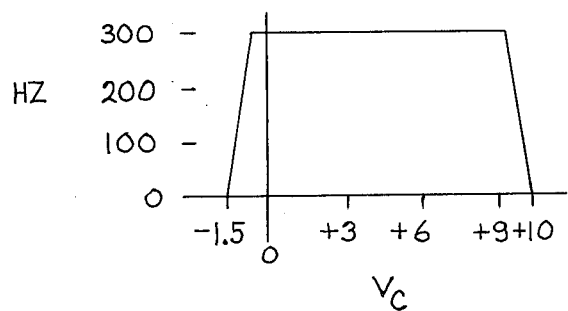
FIG. 5 is a graph showing the relationship of the output frequency to the input voltage of the V/F converter block of FIG. 4.

The variable control signal $V_C$ on line 199 and the phase 1 clock pulses on line 45a are also supplied as inputs to a voltage-to-frequency (V/F) converter 231. This component is suitably constructed and arranged to periodically produce at its output F a train of discrete 1 signals having an average frequency that is related to the value of $V_C$ in accordance with the graph shown in FIG. 5. For variations of $V_C$ between its low extreme (−1.5 V) and a predetermined first intermediate value (e.g., −0.5 V), the frequency of the output signals F varies between zero and the clock frequency (300 Hz) as a direct linear function of the value of $V_C$. For variations of $V_C$ between its high extreme (+10 V) and a predetermined second intermediate value (e.g., +9.1 V), the frequency of the output signals F varies between zero and the clock frequency as an inverse linear function of the value of $V_C$. For variations of $V_C$ in a predetermined range that is defined by the aforesaid first and second intermediate values, the frequency of F is constant and equal to the frequency of the master clock.

Figure 7:
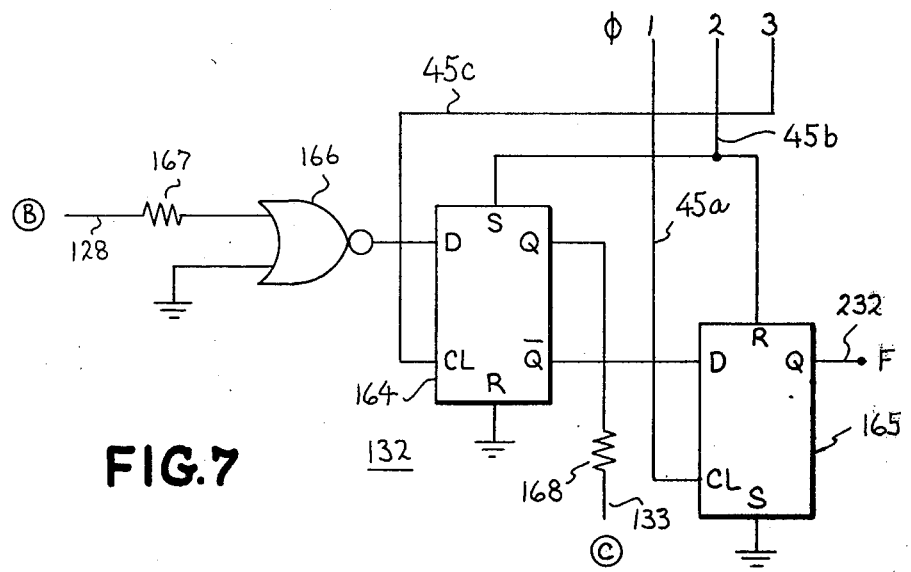
FIG. 7 is a schematic diagram of the logic and latching block of FIG. 6.

Details of a preferred embodiment of the V/F converter 231 are shown in FIGS. 6 and 7 which will soon be described. As will then be apparent, this converter is so arranged that a 0 to 1 change of its output signal F always coincides with the leading edge of a phase 1 clock pulse on the line 45a. This converter receives additional inputs via lines 45b and 45c from the master clock 44. The clock is designed to generate on line 45b a train of phase 2 pulses that are characterized by the same frequency and duration as the phase 1 pulses on line 45a but are displaced in time therefrom by a predetermined fraction of the period of the clock (e.g., by ⅓ period, or 1/900 second), and to generate on line 45c a train of phase 3 pulses that are similar to but further displaced in time from the phase 1 pulses (e.g., by ⅔ period or 2/900 second). A 1 to 0 change of each output signal F produced by this converter coincides with the leading edge of the phase 2 clock pulse that is next received after the output signal was initiated. In addition, this converter is arranged to produce at a second output E a signal that is 0 only when the value of $V_C$ is between its low extreme and the aforesaid first intermediate value and that otherwise is 1.

The output signal F of the converter 231 is connected by a line 232 to a first input of an AND logic circuit 233. Another input of the latter circuit is connected through a line 234 and inverting means 235 to the line 197 which receives the commutation suppressing signal from the burst firing block 191 (see FIG. 3). Thus there is a 1 signal on line 234 except during intervals when the burst firing means is effective to supply a 1 signal on line 197. As is shown in FIG. 4, the third input of the logic circuit 233 is connected via a line 236 to the Q bar output of a conventional D type flip flop 237. The set input of the latter component is connected through inverting means 238 to the line 107 which receives the chop enable signal from the master controls, and the clock input is connected through inverting means 239 to the output line 232 of the V/F converter 231. As will soon be explained, the flip flop 237 serves a pulse steering purpose when the signal on line 107 changes from 1 to 0. During normal operation the chop enable signal is 1 and the Q bar output of 237 is in a high or 1 state.

With 1 signals on both of its input lines 234 and 236, the logic circuit 233 will pass a 1 signal to its output line 240 concurrently with each of the periodic 1 signal from the output F of the converter 231. The line 240 is connected through an OR logic circuit 241 to the input of a one shot block 242 which produces a 1 output signal having a relatively short predetermined duration (e.g., 10 microseconds) whenever it is triggered by the signal on the line 240 changing from 0 to 1. The block 242 is connected by a line 243 to suitable emplifying and isolating means 244 which is effective while the output signal on this line is 1 to forward bias the base-to-emitter junction of an NPN transistor 245. The collector and emitter of the transistor 245 are coupled via terminals 202a and 202b to the input of the gate drive block 195 (FIG. 3), and when this transistor is forward biased its collector current is the aforesaid second gating signal that periodically causes the gate driver 195 to fire the commutating thyristor 72 in the No. 1 chopper 12. This happens each time the output signal F of the converter 231 changes from 0 to 1, providing that 1 signals are then present on both lines 234 and 236. Thus the frequency of the second gating signals is the frequency of the output signal F.

The output line 243 of the one shot block 242 is also connected to a reset input of another D type flip flop 247. As can be seen in FIG. 4, the clock input of the latter component is connected to the output line 248 of the AND logic circuit 230, and the D input is connected directly to the positive control power terminal 212. The Q output of this flip flop is coupled over a line 250 and an OR logic circuit 251 to the input of another one shot block 252 which produces a 1 output signal having a 10-microsecond duration each time it is triggered by the signal on the line 250 changing from 0 to 1. The block 252 is connected by a line 253 to suitable amplifying and isolating means 254 which is effective while the signal on this line is 1 to forward bias a transistor 255 whose collector and emitter are coupled via terminals 201$a$ and 201$b$ to the input of the gate drive block 194 (FIG. 3). When the transistor 255 is forward biased, its collector current is the aforesaid first gating signal that periodically activates the gate driver 194 which then fires the main thyristor 70 in the No. 1 chopper. This happens each time the signal on line 250 from the Q output of the flip flop 247 changes from 0 to 1.

The output of the flip flop 247 is reset to zero by the signal on line 243 each time a second gating signal is produced, and it thereafter is returned to a 1 state upon receipt of a 1 signal on the line 248 connected to the clock input. Once returned to 1, the Q output remains in this state until reset by the next 1 signal on line 243. As a result, in normal operation the signal on line 250 periodically changes from 0 to 1 at a frequency that is the same as the frequency of the second gating signals, and the first gating signals will alternate with the second gating signals.

The clock input of the flip flop 247 is connected by the line 248 to the output of the AND logic circuit 230. This circuit has four inputs: one is received on the line 228 from the output of the previously described zero crossing detector 227; another input is received on the line 236 from the Q bar output of the flip flop 237; the third is received on a line 256 from the E output of the V/F converter 231; and the fourth is received on a line 257 which is connected through inverting means 258 to the line 45$a$. The signal on line 257 serves a lockout function; it prevents a 1 signal on line 248 while each of the phase 1 pulses on line 45$a$ is 1, which is the case for an interval of approximately 300 microseconds following the initiation of each of the second gating signals. This interval, referred to hereinafter as the lockout interval, is required to make sure that the first gating signal is not produced prematurely, i.e., before the commutating thyristor has time to be completely turned off during the commutation process of the chopper.

So long as there is no phase 1 pulse on the line 45$a$, the signal on line 257 is 1, and assuming 1 signals on both of the lines 236 and 256, the signal on the output line 248 of circuit 230 will now reflect the state of the signal on line 228. As was previously explained, the signal on line 228 changes from 0 to 1 whenever the saw-tooth reference signal produced by the ramp generator 225 decreases to the value of the control signal $V_C$ on line 199. Consequently, so long as $V_C$ has a value in a range between 0 and +9.1 V, the gating signals are produced at the constant frequency of the master clock (300 Hz) and the time interval from the production of one of the second gating signals for firing the commutation thyristor to the production of the succeeding first gating signal for firing the main thyristor varies inversely with the value of $V_C$. This interval is referred to as the off time ($t_{OFF}$) of the chopper 12. It decreases toward a predetermined minimum as the value of $V_C$ approaches 9.1 V. The minimum turn off time is the same as the aforesaid lockout interval (e.g., 300 microseconds).

The duty factor of the first and second gating signals is equal to $1 - f \times t_{OFF}$, where f is the frequency of the output signal F of the V/F converter 231. So long as this converter is operating in its constant 300 Hz mode, the minimum off time of 300 microseconds restricts the maximum duty factor to approximately 0.91. As $V_C$ increases from 9.1 V to its high extreme of +10 V, the duty factor is increased from 0.91 to nearly 1.0 by reducing the average frequency of the periodic output signals F of the converter 231 while maintaining the off time substantially equal to the aforesaid minimum.

The minimum duty factor of the chopper is also restricted in the constant frequency operating mode of the converter 231, even when $V_C$ is reduced to zero or to a negative value. This is because each time the commutating thyristor is fired it will conduct a pulse of load current having a minimum duration or width which is determined by the recharging time of the commutating capacitor 74 in the oscillatory commutation circuit 71. This minimum "on" time therefore depends on the parameters of the commutation circuit, and in a practical embodiment of the invention it results in a minimum duty factor of approximately 0.09 at a chopping frequency of 300 Hz. For variations of $V_C$ from $-0.5$ V to its low extreme of $-1.5$ V, the duty factor is decreased to nearly zero by reducing the average frequency of the periodic output signals F of the converter 231. During this variable frequency, minimum pulse width mode of operation, the first gating signals for firing the main thyristor are inhibited by the 0 signal on the line 256 which disables the AND logic circuit 230 and prevents it from supplying a 1 signal on line 248 to the clock input of the flip flop 247. Consequently no gating signals are supplied by the chopper pulses block 193 to the main gate driver 194, but the chopper is alternately turned on by firing its commutating thyristor and turned off by self commutation. The commutating thyristor is periodically fired in response to the second gating signals which the block 193 is now supplying to the gate driver 195 at a reduced frequency that varies with the value of $V_C$ and that is zero when $V_C$ is at its low extreme, and each time the commutating thyristor is fired it conducts armature current for a minimum on time ($t_{ON}$) until automatically extinguished by the ringing action of its oscillatory commutation circuit. The duty factor, which can be expressed as $f \times t_{ON}$, is proportional to the frequency of the output signals F of the V/F converter 231. It will now be apparent that the chopper pulses block 193 has the capability of smoothly varying the duty factor of the chopper over a continuum that extends from 1.0 when $V_C$ is at its high extreme (+10 V) to zero when $V_C$ is at its low extreme ($-1.5$ V).

As was previously explained, normally the signal on the chop enable line 107 is 1, but during a motoring-to-braking transition it is temporarily 0. Whenever this signal changes from 1 to 0, a 1 signal is applied to the set input of the flip flop 237, thereby changing the Q output of this component from 0 to 1 and the Q bar output from 1 to 0. The Q output is connected on a line 260 to a first input of an AND logic circuit 261 whose other input is connected to the line 250 and whose output is connected via a line 262 and the OR logic circuit 241 to the input of the one shot block 242. Consequently, if the chopper were in a turned on state (as indicated by a 1 signal on line 250) at the time the flip flop 237 is set, the 0 to 1 change of the Q output on line 260 would trigger the one shot 242 and steer one last gating signal to the gate driver 195 of the commutating thyristor, thereby turning off the chopper 12. At the same time, the 1 to 0 change of the Q bar output on line 236 disables the AND logic circuits 230 and 233, and no further gating signals can be produced by the chopper pulses block 193 so long as there is no chop enable signal on line 107. Later, after the chop enable signal is restored to its 1 state, the flip flop 237 will return its Q output to the 1 state and its Q bar output to the 0 state upon receipt of a 1 signal at its clock input (indicating that the F output of the V/F converter 231 has gone from 1 to 0), and now the chopper pulses block 193 can resume normally producing gating signals to alternately turn on and turn off the chopper with a duty factor determined by the value of $V_C$.

To ensure initial turn on of the chopper 12 during the period of time that the field of motor M1 is being boosted at the beginning of a braking mode of operation, the d-c gate signal on line 196 is connected through the OR logic circuit 251 to the one shot block 252. Preferably, as is pointed out in the above-cited application. Ser. No. 35,352, this d-c gate signal is actually a short (e.g., approximately 2 milliseconds) burst of high-frequency (e.g., 21.6 KHz) discrete 1 pulses. Such pulses will repetitively trigger the block 252, and consequently a corresponding burst of gating signals is produced at terminals 201a and 210b L of the chopper pulses block 193. This burst of gating signals has the same frequency as the pulses comprising the d-c gate signal, and it is referred to herein as the extended chopper turn on signal. Whenever the burst firing means is effective to supply the gate driver 194 with this extended chopper turn on signal, the gate driver responds by supplying a correspondingly extended initial firing signal to the main thyristor of the chopper 12. A gate driver well suited for this purpose is described and claimed in copending patent application Ser. No. 35,351 filed concurrently herewith for R. B. Bailey and assigned to the General Electric Company. Concurrently with the extended chopper turn on signal, and for whatever additional time is necessary in order for $I_A$ to attain the aforesaid 100-amp threshold, the commutation suppressing signal on line 197 is in a 1 state (and the signal on line 234 is 0), thereby disabling the AND logic circuit 233 and preventing the chopper pulses block 193 from producing any second gating signals that would otherwise cause the gate driver 195 to fire the commutating thyristor and turn off the chopper.

With one exception, the chopper pulses block for the No. 2 chopper control means 23 is the same as the block 193 shown in FIG. 4. The one exception involves the connections to the master clock 44. Where FIG. 4 shows a line 45a supplied with phase 1 pulses from the master clock, the corresponding line of the No. 2 chopper pulses block should be supplied with phase 2 pulses, whereby the resetting of its ramp generator and the production of an output signal F by its V/F converter will be delayed one-third of the period of the master clock with respect to the occurance of these events in the No. 1 chopper pulses block. Similarly, the pulses block in the controls for a third chopper (not shown) should be synchronized with the phase 3 pulses of the master clock. In propulsion systems using six chopper/motor units, the master clock could be provided with a 6-phase output. In this manner the respective choppers are turned off in sequence rather than in unison. By thus staggering the off times of the respective choppers, the amplitude of ripple current in the filter 32 is desirably minimized.

The presently preferred embodiment of the voltage-to-frequency converter 231 is shown schematically in FIG. 6. In accordance with our invention, it includes integrating means 116 having an input terminal 117 and an output terminal 118. Preferably the integrating means 116 is an operational amplifier shunted by a capacitor 119. A plurality of analog signals are selectively applied to the input terminal 117, and the integrator 116 produces at its output terminal 118 a variable signal "A" having a value that depends on the time integral of the net value of the input signals. For applying a first input signal to this integrator, a relatively positive control power terminal (e.g., +15 volts) is connected to the input terminal 117 through a series resistor 120 (e.g., 200 kilo-ohms) and a first branch 121 of a line 124. Two other branches 122 and 123 of the line 124 are connected to the control signal input line 199 through separate signal altering means which will soon be explained.

The output signal A of the integrator 116 is supplied to bistable threshold detecting means 125, the state of which depends on whether the signal A is on one side or the other of a predetermined threshold. Preferably the threshold detector 125 is an operational amplifier whose inverting input is connected through a resistor 126 to the output terminal 118 of the integrator 116 and whose non-inverting input is connected through a resistor 127 to a control power terminal at reference or ground potential. The output of this device is a signal "B" on line 128. The output line 128 and the non-inverting input of the operational amplifier 125 are interconnected by a positive feedback path comprising a resistor 130, and the output line is also connected to the inverting input by a diode 131 that clamps the output signal B at nearly ground potential whenever the signal A is positive with respect to ground. So long as the signal A is relatively positive, the detector 125 is in a first state that results in its output signal B being near ground potential (a logic "0" signal), but whenever the signal A is negative with respect to ground, the detector is in a second state that results in the signal B being relatively positive or "1".

The output line 128 of the threshold detector 125 is connected to one input of a block 132 labeled "Logic and Latching." This logic block 132 has other inputs that receive, on lines 45a, 45b, and 45c, respectively, the first, second and third trains of digital signals supplied by the master clock 44. The 1 signals in these three trains are respectively designated phase 1, phase 2, and phase 3 clock pulses, and as was previously explained they are staggered by uniform intervals equal to one-third of the constant period of the master clock. Details of a preferred embodiment of the block 132 are shown in FIG. 7. It will soon be apparent that the logic block is operative while the signal B on line 128 is 1 to periodically change the signal "C" on an output line 133 from 1 to 0 in synchronism with the phase 3 clock pulses. Whenever the signal C is 0, the block 132 is also operative to produce on its output line 232 a discrete signal F that changes from 0 to 1 in synchronism with a phase 1 clock pulse and that changes from 1 to 0 in synchronism with the succeeding phase 2 clock pulse, at which time the signal C is changed from 0 to 1.

As is shown in FIG. 6, the signal C on the output line 133 of the logic and latching block 132 is connected to the control electrode of a FET switch 134 in a line 135 that connects a relatively negative control power terminal (e.g., −15 volts) to the input terminal 117 of the integrator 116. Whenever the switch 134 is turned on (closed) there is current $i_2$ in the line 135, thereby providing a second input signal that is applied to the terminal 117 subtractively with respect to the first signal on line 124. This current is limited to a predetermined constant magnitude by a series resistor 136 between the switch 134 and the negative control power terminal. The relatively positive end of the resistor 136 is connected to ground through a diode 137. Normally the signal C on line 133 is 1, thereby biasing the switch 134 to a turned off (open) state and cutting off the second signal on line 135. But when the logic block 132 periodically changes the signal C to its 0 state, the switch 134 turns on to activate the second signal applying means, and a second signal of predetermined magnitude and duration is applied to the input terminal 117. The switch 134 remains on for a limited interval, and the predetermined duration of the second signal on line 135 is preferably no longer than the predetermined period of the phase 1 clock pulses generated by the master clock 44. In the illustrated embodiment of the invention the duration of the second signal $i_2$ coincides with the 0 interval of signal C which is just two-thirds of the period of the constant frequency clock pulses. The magnitude of this signal is selected so that its average value over a full period of the phase 1 clock pulses is substantially equal to the value that the first input signal on line 124 will have whenever $V_C$ has a value of either −0.5 or +9.1 volts. In the illustrated embodiment, this average value corresponds to 50 microamps, and it is obtained by using a 200 K resistor at 136.

The variable signal A at the output 118 of the integrator 116 tends to change from positive to negative when the value of the first signal on input line 124 exceeds the value of the second signal on input line 135. The first signal on line 124 is actually a composite of signals k and $i_1$, or k and $i_3$ on the branch lines 121 and 122, or 121 and 123, respectively. Assuming both $i_1$ and $i_3$ are zero, the first signal is the same as the continuous, substantially constant signal k supplied on line 121, and the magnitude of the latter signal is selected (e.g., 75 microamps) so that it is higher than the average value of the second signal $i_2$. Consequently, in the absence of signals on lines 122 and 123 the integrator 116 is in a saturated state with its output signal A at a maximum negative value (e.g., −13 V). This causes the threshold detector 125 to remain in its second state, and the signal B on its output line 128 will be continuously high or 1. As a result, the logic block 132 is operative to produce at its output F a train of discrete 1 signals synchronized with successive pulses in the train of phase 1 clock pulses supplied on line 45a, whereby the frequency of the F signals correspond to the constant frequency of the master clock. This is the constant frequency mode of the V/F converter 231.

While in its constant frequency mode, the converter produces a high or logic 1 signal at its second output E which is connected to the line 256. As can be seen in FIG. 6, this output is taken from a NAND gate 138. A first input of the gate 138 is connected via a line 140, a resistor 141, and an operational amplifier 142 to the junction of a pair of voltage dividing resistors 143 and 144. The latter resistors are serially connected between the positive control power terminal and the output terminal 118 of the integrator 116. Whenever the potential of their junction is negative with respect to ground, as occurs when the signal A is negative and has a magnitude of at least 10 volts, the operational amplifier 142 impresses a low or 0 signal on the input line 140 of the gate 138, whereby the signal E on the output line 256 is in a 1 state.

The first signal that is applied on the line 124 to the input terminal 117 of the integrator 116 is significantly altered whenever the value of the variable control signal $V_C$ on line 199 is either in a low range, i.e. between its first or low extreme (−1.5 V) and its first intermediate value (−0.5 V), or in a high range, i.e. between its second or high extreme (+10 V) and its second intermediate value (+9.1 V). In the low range, there is a current $i_1$ in line 122 that subtracts from the current k in line 121 and reduces the net value (k-$i_1$) of the first signal, and in the high range there is a current $i_3$ in line 123 that subtracts from k and reduces the net value (k-$i_3$) of the first signal. In between these low and high ranges, the subtractive contribution of $i_1$ or $i_3$ will be too small to reduce the first signal below a value that keeps the integrator 116 in its saturated state. Indeed, with $V_C$ between 0 and +5 V the current $i_1$ flows in the direction opposite to that shown in FIG. 6, i.e. it flows toward (rather than away from) the summing junction 117, and this drives the integrator even further into saturation.

As is shown in FIG. 6, the line 122 is connected through a FET switch 145 and a series resistor 146 (e.g., 20,000 ohms) to the control signal line 199. The switch 145 is turned on (closed) whenever $V_C$ is less positive that +5 volts, as determined by level detecting means 147. Preferably the level detector 147 is an operational amplifier whose inverting input is connected through a resistor 148 to the line 199 and whose non-inverting input is connected to a reference potential terminal 149 that sets the "pick up" level at +5 V. The output of the detector 147 is connected through a resistor 150, a line 151, and inverting means 152 to the control electrode of the switch 145. If the value of $V_C$ were between +5 V and its high extreme, the output of level detector 147 would be "0", and the resulting 1 output of the inverter 152 would bias the switch 145 to a turned off (open) state. The output line 151 is also connected to the second input of the NAND gate 138, whereby a 1 signal is produced at the E output of the converter 231 whenever $V_C$ is higher than +5 V.

Whenever the value of $V_C$ is negative with respect to ground, the current $i_1$ in line 122 is supplied from the line 121, and the value of the first signal on input line 124 is correspondingly reduced. In other words, the first signal is now equal to k-$i_1$. When $V_C$ traverses its intermediate value of −0.5 V, the signal $i_1$ on line 122 is 25 microamps and the first signal on line 124 is reduced to 50 microamps. Since the second signal $i_2$ on line 135 was selected to have an average value of 50 microamps, the integral of the net value of the first and second signals, over one period of the phase 1 clock pulses, is now zero and the integrator is in equilibrium. In other words, when $V_C$ is −0.5 V the integrator 116 will integrate "up" and "down" equal amounts during each period of the clock pulses, and the signal A at the output of the integrator will cross the ground potential threshold, in a negative-going sense, exactly once per cycle of the constant-frequency master clock.

As $V_C$ changes from $-0.5$ V to its low extreme of $-1.5$ V, $i_1$ increases proportionately, and the first signal ($k$-$i_1$) on line 124 therefore decreases from 50 microamps to zero. In this range of $V_C$ once the switch 134 in line 135 is activated to apply the second signal to the input of the integrator 116, the output signal A of the integrator will experience a net change in the positive sense after one period of the clock pulses. Therefore more time has to elapse before the signal A again crosses its ground potential threshold and the output signal B of the threshold detector 125 can change from 0 to 1. Consequently the signals at the C and F outputs of the logic and latching block 132 will now be produced at a frequency lower than the constant 300 Hz of the master clock. The average frequency of these signals will be proportional to the value of the first signal on line 124, and it is reduced to zero when $V_C$ is at its low extreme of $-1.5$ V. In this mode of operation, the frequency of the V/F converter 231 varies as a direct linear function of $V_C$.

Figure 8:
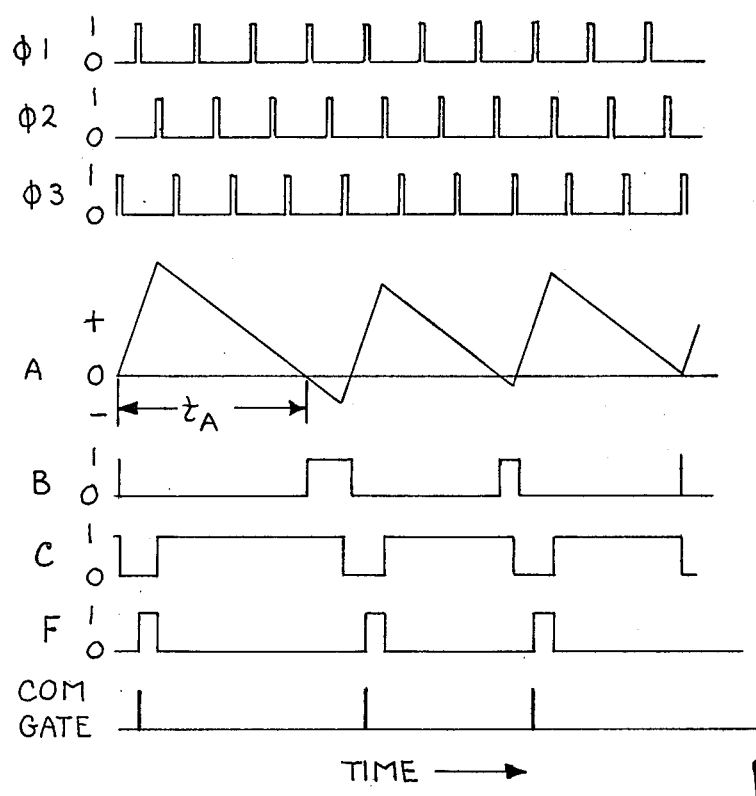
FIG. 8 is a chart showing the states of various signals in the V/F converter of FIG. 6 when operating in a reduced frequency mode over an interval of 10 cycles of the master clock.

The operation of the V/F converter 231 at frequencies below 300 Hz can be better appreciated from inspection of FIG. 8 which shows the changes in signals A, B, C, and F during a time frame of 10 cycles of the constant frequency master clock for steady-state operation of the converter at an average frequency of 90 Hz. In this case the first signal on line 124 is assumed to have a value of 15 microamps, which is true when $V_C$ is $-1.2$ V. During the interval from the first one of the illustrated phase 3 clock pulses to the succeeding phase 2 clock pulse, the signal C is 0, and the net value of the first and second signals that are then being applied to the input of the integrator 116 is $-60$ microamps. The resulting positive-going excursion of the integrator output is shown in trace A. Half way through this same interval the discrete signal F is produced in response to a phase 1 clock pulse, and the resulting gating signal for the gate driver that fires the commutating thyristor is shown in FIG. 8 by the trace labeled "Com. Gate." The succeeding phase 2 clock pulse simultaneously returns the signal C to its normal 1 state and terminates the signal F. At this point the second signal is cut off and the first signal ($+15$ microamps) alone is integrated. The resulting negative-going excursion of the integrator output A takes place at one-fourth the rate of the positive-going excursion and lasts four times longer. The period ($t_A$) between negative-going threshold crossings of the signal A is therefore $3\frac{1}{3}$ times the constant period of the phase 3 clock pulses. At the end of the period $t_A$ the integrator output signal A becomes negative with respect to ground and the output signal B of the threshold detector 125 changes from 0 to 1. After this event the next phase 3 clock pulse to be received by the logic block 132 will cause this block to change its C output from 1 to 0, whereupon the second signal applying means is reactivated and signal A begins another positive-going excursion. This 1 to 0 change of signal C marks the end of the first operating cycle illustrated in FIG. 8. Two more cycles of the V/F converter are shown. It will be apparent that three discrete signals F are produced for ten cycles of the master clock, and each one is synchronized with a phase 1 clock pulse. These signals have an average frequency of 90 Hz, but they are not uniformly spaced.

FIG. 8 typifies average frequencies that are not even submultiples (e.g., $\frac{1}{2}, \frac{1}{3}, \frac{1}{4}, \ldots 1/300$) of 300 Hz, whereby $t_A$ is not a whole-number multiple of the constant period of the master clock. In such cases the period between consecutive 0 to 1 changes of the signal B is uniform, but these changes do not always coincide with a phase 3 clock pulse, and after some of them the logic block 132 of the V/F converter has to wait for the next phase 3 clock pulse before it produces a 1 to 0 change in its output signal C and, subsequently, a 0 to 1 change of signal F. During each such waiting period the signal A becomes more negative and represents an error that is stored in the integrator 116. The succeeding waiting period is therefore shorter, and eventually (after the second cycle in the example of FIG. 8) the cumulative error is sufficient to enable the 0 to 1 change of signal B to coincide with a phase 3 clock pulse. When the V/F converter is operating in its variable frequency mode, its harmonic frequency spectrum has side bands of frequencies associated with 300 Hz, and this can be advantageous in practice.

Returning to FIG. 6, the means for significantly altering the first input signal on line 124 when $V_C$ is higher than $+9.1$ V will now be described. The line 124 is connected by its branch line 123, a series resistor 154, and a diode 155 to an output terminal 156 of an operational amplifier 157. The non-inverting input of the operational amplifier 157 is connected directly to ground, and the inverting input of this amplifier is connected to a junction 158 of two resistors 160 and 161 that are serially connected between the control signal line 199 and the negative control power terminal. The inverting input and the output of the amplifier 157 are interconnected by the parallel combination of a resistor 162 and a diode 163. The current in the resistor 160 tracks $V_C$. So long as this variable current is less than the constant current in resistor 161, the output of the amplifier 157 is slightly positive, the diode 155 is reverse biased, and there is no current in line 123. But when $V_C$ increases to a sufficiently high positive value, the resistor 160 current becomes greater than the resistor 161 current, the output terminal 156 goes negative, and the diode 155 is able to conduct. The resulting current $i_3$ in line 123 is proportional to the difference between the currents in resistors 160 and 161, and the first input signal on line 124 will now be equal to $k$-$i_3$. When $V_C$ traverses its intermediate value of $+9.1$ V, the signal on line 123 is 25 microamps, the first signal on line 124 is reduced to 50 microamps, and the period $t_A$ of the integrator output signal A is just equal to the constant period of the phase 3 clock pulses. As $V_C$ changes from $+9.1$ V to its high extreme of $+10$ V, $i_3$ increases proportionately from 25 to 75 microamps, and the first signal on line 124 therefore decreases from 50 microamps to zero. In this range of $V_C$, the integrator 116, the threshold detector 125, and the logic block 132 respond as previously described to produce the C and F output signals at a frequency lower than the constant 300 Hz of the master clock. The average frequency of these signals is proportional to the value of the first signal on line 124, and the frequency is reduced to zero when $V_C$ is at its high extreme of $+10$ V. In this mode of operation, the frequency of the V/F converter 231 varies as an inverse linear function of $V_C$.

A preferred embodiment of the logic and latching block 132 of the V/F converter 231 is shown schematically in FIG. 7. It comprises first and second conventional D-type flip flop devices 164 and 165. The set input of the flip flop 164 is connected to line 45b and the clock input is connected to line 45c. The D input of this device is connected through inverting means 166 and a series resistor 167 to the line 128 on which the signal B is received from the output of the threshold detector 125, and the Q output is connected through a series resistor 168 to the line 133 which couples the output signal C to the switch 134 in the second signal line 135. Assuming that the Q output of the flip flop 164 is high or "1", is will be driven to 0 every time a phase 3 clock pulse is received at the clock input of this device while there is a 0 signal on the D input. Consequently, any 1 to 0 change of signal C will coincide with the leading edge of a phase 3 clock pulse, providing that at the same time the signal B on line 128 is 1. Thereafter, after an interval equal to two-thirds of the constant period of the master clock, the Q output (and hence the signal C) is returned to its 1 state when the succeeding phase 2 clock pulse is received at the set input of the device 164.

The reset input of the companion flip flop 165 is connected to line 45b and the clock input is connected to the line 45a. The D input of the device 165 is connected to the Q bar output of the flip flop 164, and the Q output of 165 is connected to the line 232 on which the discrete signals F are periodically produced. Assuming that the Q output of the flip flop 165 is low or "0," this device effects a 0 to 1 change of its Q output every time the leading edge of a phase 1 clock pulse is received at its clock input while there is a 1 signal on the D input. Consequently any 0 to 1 change of signal F will coincide with the leading edge of a phase 1 clock pulse, providing that at the same time the signal C on line 133 is 0. Once this happens, the Q output (and hence signal F) is automatically returned to its 0 state when the succeeding phase 2 clock pulse is received at the reset input of the device 165.

The three staggered trains of 300-Hz clock pulses that are respectively fed on lines 45a, 45b, and 45c to the logic and latching block 132 can be supplied by digital counters that are in turn fed from a higher frequency master clock. In an alternative embodiment, such a counter can be included as part of the logic and latching component itself. In this case only one out of every "n" pulses from the master clock is significant, where n is the ratio of the master clock frequency to the desired maximum or constant frequency (e.g., 300 Hz) of the output pulses F. Persons skilled in the art will understand that where the terms "constant frequency" and "predetermined period" are used herein with reference to a train of clock pulses, we are referring to those particular clock pulses with which the output signals are synchronized when the integrator 116 of the V/F converter is saturated.

While a preferred embodiment of the invention has been shown and described by way of example, many modifications will undoubtedly occur to persons skilled in the art. The concluding claims are therefore intended to cover all such modifications as fall within the true spirit and scope of the invention.

What we claim as new and desire to secure by Letters Patent of the United States is:

1. In an electrical circuit for periodically generating discrete output signals, the combination comprising:
   a. means for supplying a variable control signal having a value that can vary between predetermined low and high extremes;
   b. integrating means having input and output terminals;
   c. signal applying means connected to the input terminal of said integrating means and responsive to said control signal for applying to said input terminal a first signal having a value that varies as an inverse linear function of the control signal value during variations of the latter within a predetermined range defined by said predetermined high extreme and a predetermined intermediate value which is inbetween said low and high extremes, the value of said first signal being essentially zero whenever the value of said control signal is at said predetermined high extreme;
   d. bistable threshold detecting means connected to the output terminal of said integrating means and having first and second states, said bistable detecting means being in its first state when the output signal of the integrating means has a value on one side of a predetermined threshold and being in its second state whenever the value of said output signal is on the other side of said threshold;
   e. means for supplying a train of clock pulses having a constant frequency and a predetermined period;
   f. normally inactive means connected to the input terminal of said integrating means and effective when activated for applying to said input terminal a second signal having a predetermined duration, said second signal being applied subtractively with respect to said first signal and having an average value, during said predetermined period of said clock pulses, substantially equal to the value that said first signal will have whenever said control signal has said predetermined intermediate value;
   g. said integrating means being operative to produce at its output terminal a variable output signal having a value that depends on the time integral of the net value of signals applied to said input terminal and that tends to change from said one side of said predetermined threshold to said other side when the value of said first signal exceeds that of said second signal; and
   h. logic means connected to said bistable detecting means, to said clock pulse train supplying means, and to said normally inactive means and responsive to said bistable detecting means changing from said first to said second states for activating said normally inactive means and for producing a discrete output signal in synchronism with one of said clock pulses, said logic means also being operative periodically to produce additional discrete output signals synchronized with successive clock pulses supplied to the logic means so long as said bistable detecting means remains in its second state, whereby the average frequency of said discrete output signals corresponds to the frequency of said clock pulses when the value of said control signal is lower than said intermediate value but decreases toward zero as the control signal value increases within said predetermined range and approaches said high extreme.

2. The combination as set forth in claim 1 wherein said first signal comprises the difference between a continuous substantially constant signal and a variable signal whose value is proportional to the value of said control signal when the latter is within said predetermined range, said variable signal value being equal to the value of said constant signal whenever said control signal value is at said predetermined high extreme.

3. The combination of claim 2 wherein the value of said constant signal is higher than said average value of said second signal, and wherein said first signal applying means is so constructed and arranged that said variable signal is zero when said control signal is appreciably lower than said intermediate value.

4. The combination of claim 2 wherein said second signal has a value approximately the same as the value of said constant signal and a duration equal to approximately two-thirds of said predetermined period of said clock pulses, and wherein the value of said variable signal is equal to approximately one-third of said constant signal value whenever said control signal has said predetermined intermediate value.

5. The combination as set forth in claim 1 wherein said logic means comprises bistable flip flop means which is driven from one state to another state every time a clock pulse is supplied while said bistable threshold detecting means is in its second state and which thereafter is returned to said one state after a predetermined fraction of said predetermined period of said clock pulses, said normally inactive means is connected to said flip-flop means for activation when said flip flop means is in said other state, and said logic means further comprises means effective while said flip flop means is in said other state for producing said discrete output signals in synchronism with said clock pulses.

6. The combination as set forth in claim 1 wherein said clock pulse supplying means supplies first, second, and third trains of clock pulses that are respectively staggered by uniform intervals equal to one-third of said predetermined period, said logic means comprises bistable flip flop means which is driven from one state to another state every time a clock pulse in said third train is supplied while said bistable threshold detecting means is in its second state and which thereafter is returned to said one state in response to the next clock pulse in said second train, said normally inactive means is connected to said flip flop means for activation when said flip flop means is in said other state, and said logic means further comprises means effective while said flip flop means is in said other state for producing said discrete output signal every time pulse in said first train is supplied.

* * * * *